UNITED STATES PATENT OFFICE.

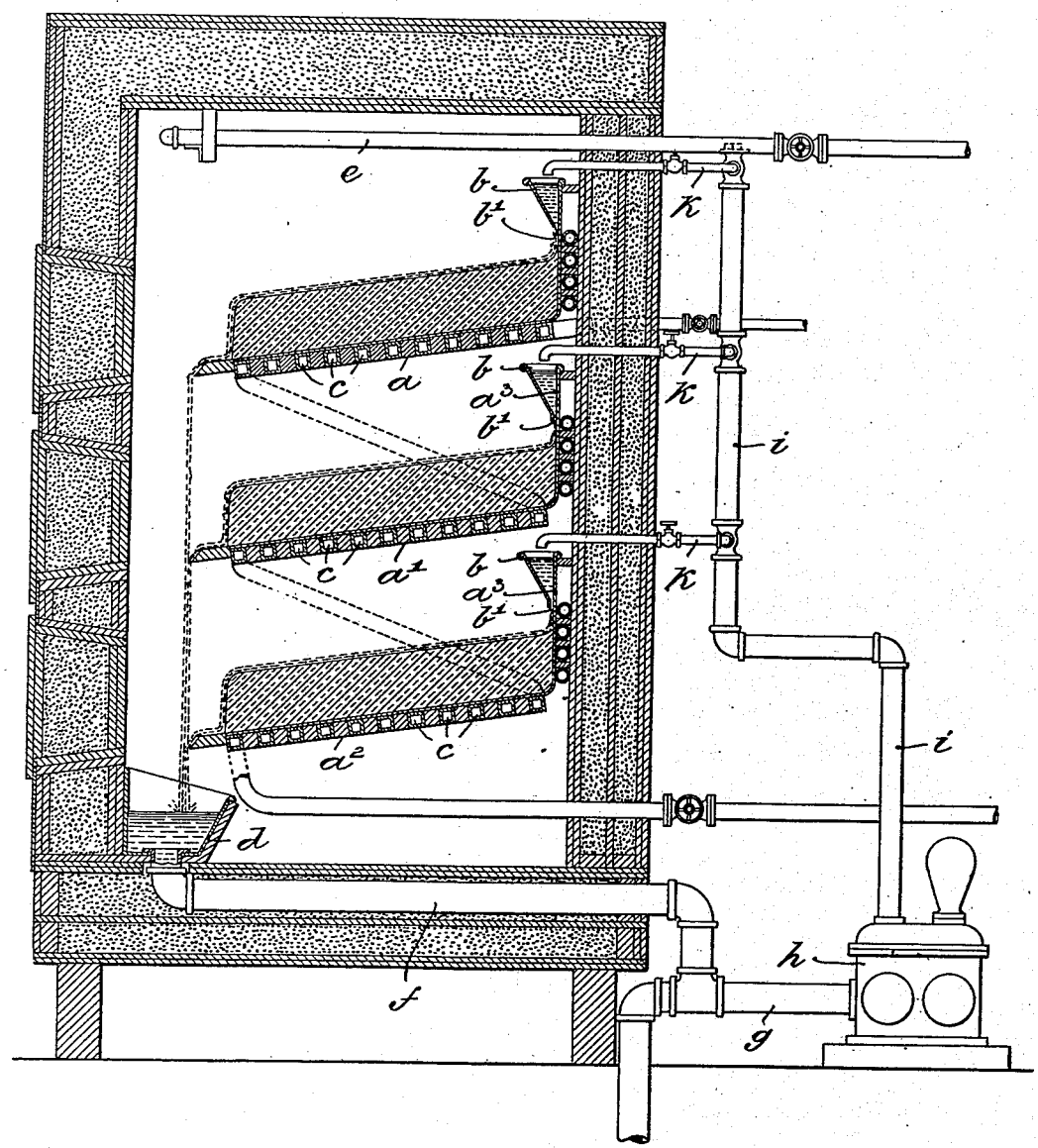

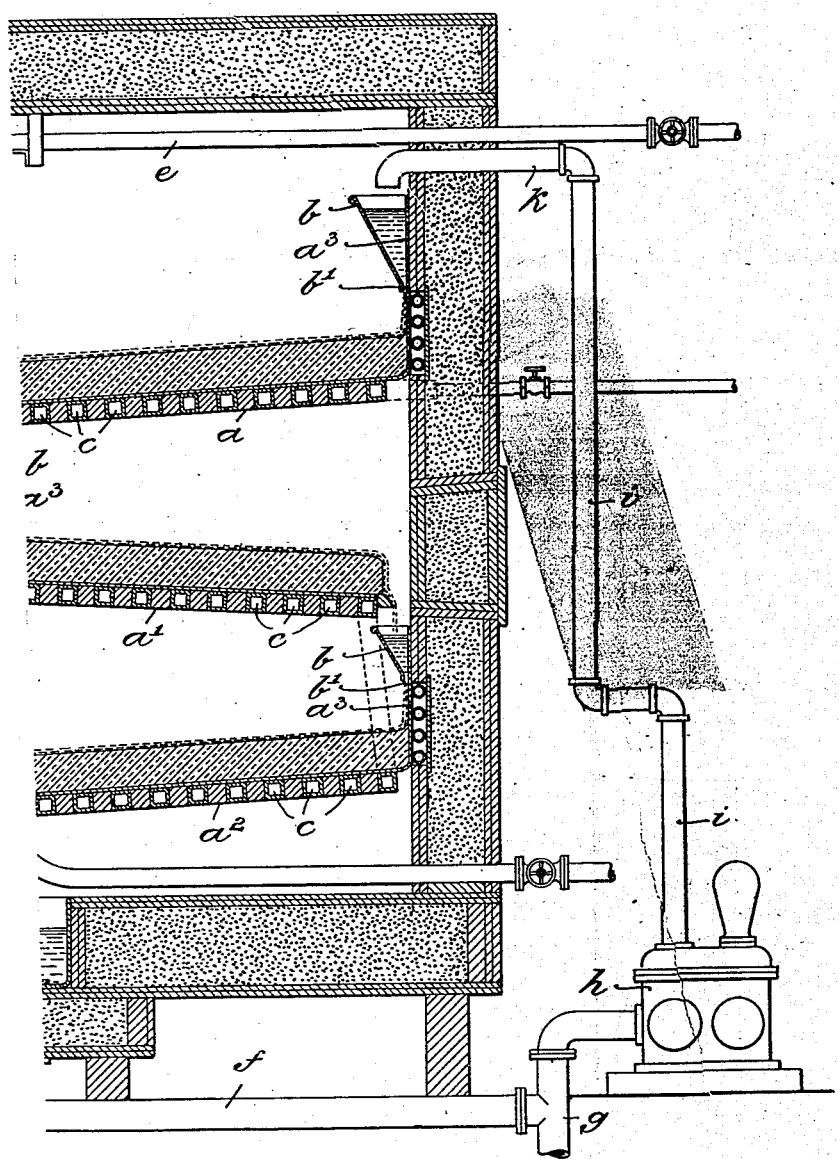

EDWARD BARRATH, OF PHILADELPHIA, PENNSYLVANIA, ASSIGNOR OF TWO-THIRDS TO AUGUSTUS BEITNEY AND JOHN J. KELLER, OF PHILADELPHIA, PENNSYLVANIA.

ART OF MANUFACTURING PLATE-ICE.

SPECIFICATION forming part of Letters Patent No. 706,510, dated August 12, 1902.

Application filed November 27, 1901. Serial No. 83,943. (No specimens.)

*To all whom it may concern:*

Be it known that I, EDWARD BARRATH, a citizen of the United States, residing at the city of Philadelphia, in the county of Philadelphia and State of Pennsylvania, have invented certain new and useful Improvements in the Art of Manufacturing Plate-Ice, of which the following is a specification.

My invention has relation to the manufacture of plate-ice in a pure crystal-like state free from air-bubbles and needles.

The principal object of my present invention is to provide as an improvement in the art of manufacturing artificial plate-ice from constantly-flowing water a method whereby the water to be frozen is first stilled or brought to rest and then is formed into a film of required thickness. Then the film so formed is caused to flow continuously by gravity over an artificial freezing medium, plate, or means and continuing over the strata of ice after said ice forms upon the freezing medium, plate, or means until the plate of ice has been built up by successive accretions.

The nature and scope of my invention will be more fully understood from the following description, taken in connection with the accompanying drawings, illustrating a plant found well adapted for the conduct of the method of my said invention, in which—

Figure 1 is a sectional view of an ice plant in one form embodying features for the conduct of the method of my invention, and Fig. 2 is a sectional view of another or modified form of such an ice plant for carrying out therein my said invention.

Referring to the drawings, $a$, $a'$, and $a^2$ represent freezing plates or platforms of any suitable construction, but preferably arranged as hereinafter explained and illustrated. These freezing plates or platforms $a$, $a'$, and $a^2$ are preferably superposed and slightly inclined. Each of the freezing plates or platforms is provided with a vertical projecting extension $a^3$, forming in the present instance a support and a portion of a water tank or receptacle $b$, arranged a certain distance above each of the plates or platforms $a$, $a'$, and $a^2$. The tanks or receptacles $b$ are made tapering or substantially wedge-shaped in cross-section and are provided at their lower ends with a narrow outlet $b'$ to allow the water in said tanks $b$ to flow from each of them in the form of a film or sheet. Such a film or sheet of water is conveyed in a downward direction by the vertical projecting extension $a^3$ of each of the plates or platforms $a$, $a'$, and $a^2$ onto the same and over which it then passes by gravity, due to the inclined position of the plates. The speed of flow of the water over the freezing plates or platforms can be readily regulated by more or less inclining the plates or platforms. Through the pipes $c$ of the freezing plates or platforms is conducted any suitable freezing medium, such as brine or ammonia, and the water passing over the plates or platforms in the form of a film or sheet is rapidly frozen thereon by the action of the freezing medium. The surplus water not congealed or frozen on said plates or platforms $a$, $a'$, and $a^2$ in its travel over the same is either collected from each of the plates or platforms into a tank or receptacle $d$, as illustrated in Fig. 1, or is conducted from one plate or platform onto the next one below and from the last of said freezing plates or platforms into the collecting-tank $d$, as illustrated in Fig. 2. In the latter instance, however, the extensions $a^3$ of the freezing plates or platforms $a$, $a'$, and $a^2$ and the tanks $b$ are preferably arranged opposite each other, so that the surplus water, as shown, will be directly conducted into the tank $b$ of the second superposed plate or platform, and so on, for the distribution or spreading of the same into film or sheet form over the freezing plates or platforms.

Above the uppermost freezing plate or platform $a$ is arranged an air-cooling coil $e$ to cool the air above said plate or platform. The air above and between the other plates or platforms $a'$ and $a^2$ is cooled by the free under side of the freezing-pipes $c$ and for this reason requires no special cooling-pipes. The air so cooled forms an additional freezing medium adjacent to said freezing plates or platforms $a$, $a'$, and $a^2$, which assist in the chilling of the film or sheet of water passing over said plates or platforms. The film of water chilled from both sides will rapidly congeal and freeze to the plates or platforms $a$, $a'$, and $a^2$. A film of water by being continuously kept in motion over the previously-frozen strata will by successive accretions to the same build up a plate of ice upon the freezing plate or platform of any thickness desired and in much less time than hitherto was required. A body of water of any size being presented to a freezing medium in the form of a film or sheet will therefore be rapidly congealed or frozen. By so rapidly forming ice less space for the production of a given quantity of ice is required, and hence the number of freezing plates or platforms is greatly lessened for the production of such ice. By this reduction of freezing plates or platforms and pipes it follows that also a smaller engine and compressor for a given quantity of ice will be required and the cost of production of the plate-ice will be reduced to a fraction as compared with the present cost of production of block-ice. The film or sheet of water being kept in motion on the freezing plates or platforms $a$, $a'$, and $a^2$ prevents internal air-bubbles in the formation of the ice, and thus plate or block ice in a pure and crystal-like state is obtained. This feature of preventing air-bubbles from freezing either to the freezing-plate or to the previously-formed strata of ice by simply keeping said film of water in motion succesively overcomes the necessity of artificial agitation of the water to be frozen, as in the ordinary processes employed. Furthermore, such agitation—for instance, by means of air injected into the water to be congealed—causes the heating of the same by the air, which heating naturally retards the congealing or freezing of the water. The surplus water from the freezing plates or platforms $a$, $a'$, and $a^2$, which has a temperature at or near the freezing-point and which is collected in the tank or receptacle $d$, as hereinbefore described, is conducted back onto said plates or platforms and the previously-frozen strata by means of pipes $f$ and $g$, a pump $h$, and a supply-pipe $i$ and branch pipes $k$, leading from said supply-pipe $i$, to the distributing-tanks $b$. Owing to the low temperature of said surplus water the same will be more rapidly congealed, and thus accelerate the freezing operation.

Instead of feeding the surplus water to each of the distributing-tanks $b$ simultaneously, as illustrated in Fig. 1, the surplus water can be fed by the supply-pipe $i$ to the uppermost distributing-tank $b$ only, from which the surplus water passes in film-like form, as hereinbefore explained, from one freezing plate or platform to another successively and finally, if not congealed or frozen to the previously-frozen ice on said plates or platforms, be returned to the collecting-tank $d$. The pipe $g$, into which the pipe $f$ from the collecting-tank $d$ emerges, conducts and mixes the surplus water with the supply-water drawn by the pump $h$ from any suitable source and cools the same. However, this surplus water can be fed independently from the supply-water to the distributing-tanks $b$.

Having thus described the nature and objects of my invention, what I claim as new, and desire to secure by Letters Patent, is—

1. The improvement in the art of manufacturing artificial plate-ice from constantly-flowing water, which consists in stilling the water, presenting the stilled water continuously in a film of substantially uniform thickness to an artificial freezing medium and causing the continuous flow of such films over the medium and over successive strata of ice, until a plate of ice has been built up by successive accretions.

2. The improvement in the art of manufacturing artificial plate-ice from constantly-flowing water, which consists in stilling the water, presenting the stilled water continuously in a film of substantially uniform thickness and causing the continuous flow of such films over an artificial freezing medium, under the influence of gravity.

In testimony whereof I have hereunto set my signature in the presence of two subscribing witnesses.

EDWARD BARRATH.

Witnesses:
J. WALTER DOUGLASS,
THOMAS M. SMITH.